United States Patent
Niemöller et al.

(10) Patent No.: US 11,667,802 B2
(45) Date of Patent: Jun. 6, 2023

(54) TRANSFER MEDIA FOR TRANSFERRING SUBLIMATION DYES ONTO THREE-DIMENSIONAL SURFACES

(71) Applicant: Sihl GmbH, Düren (DE)

(72) Inventors: Axel Niemöller, Düren (DE); Arthur Reiners, Erkelenz (DE); Steffen Ohr, Sursee (CH); Dominic Herren, Bern (CH)

(73) Assignee: Sihl GmbH, Düren (DE)

( * ) Notice: Subject to any disclaimer, the term of this patent is extended or adjusted under 35 U.S.C. 154(b) by 0 days.

(21) Appl. No.: 17/667,131

(22) Filed: Feb. 8, 2022

(65) Prior Publication Data
US 2022/0251407 A1    Aug. 11, 2022

(30) Foreign Application Priority Data
Feb. 9, 2021   (EP) .................................... 21156050

(51) Int. Cl.
| | |
|---|---|
| *D06P 5/00* | (2006.01) |
| *C09D 11/328* | (2014.01) |
| *C09D 11/037* | (2014.01) |
| *C09D 11/106* | (2014.01) |
| *C09D 11/107* | (2014.01) |

(52) U.S. Cl.
CPC .......... *C09D 11/328* (2013.01); *C09D 11/037* (2013.01); *C09D 11/106* (2013.01); *C09D 11/107* (2013.01)

(58) Field of Classification Search
CPC ... C09D 11/328; C09D 11/037; C09D 11/106; C09D 11/107; B41M 5/0256; B41M 5/035; B41M 5/0355; B41M 5/502

USPC ............................................................. 8/471
See application file for complete search history.

(56) References Cited

U.S. PATENT DOCUMENTS

| | | |
|---|---|---|
| 8,477,163 B2 | 7/2013 | Hirst |
| 8,557,355 B2 | 10/2013 | Hann et al. |
| 8,664,158 B2 | 3/2014 | Vavassori Bisutti |
| 2002/0198328 A1 | 12/2002 | L'alloret |

(Continued)

FOREIGN PATENT DOCUMENTS

| | | | |
|---|---|---|---|
| CN | 1476987 A * | 2/2004 | ............ B41M 5/502 |
| EP | 1973749 B1 | 7/2012 | |

(Continued)

OTHER PUBLICATIONS

Mino et al., "A New Method for the Preparation of Graft Copolymers. Polymerization Initiated by Ceric Ion Redox Systems", Journal of Polymer Science, 1958, pp. 242-243, vol. 31:122.

(Continued)

*Primary Examiner* — Eisa B Elhilo
(74) *Attorney, Agent, or Firm* — The Webb Law Firm (57) ABSTRACT

The present invention relates to inkjet printable transfer media for transferring a sublimation dye and/or another functional active ingredient to a surface of an article by means of heat in a thermoformable process, to methods for preparing such inkjet printable transfer media and for providing at least a part of a surface of an article with sublimation dye and/or another functional active ingredient as well as the use of such inkjet printable transfer media in different technical fields.

15 Claims, 1 Drawing Sheet

(56) References Cited

U.S. PATENT DOCUMENTS

| | | | | |
|---|---|---|---|---|
| 2008/0229962 A1* | 9/2008 | Shedd | ............... | B41M 5/0256 |
| | | | | 428/211.1 |
| 2019/0263164 A1* | 8/2019 | Martorana | ........... | B41M 5/0256 |
| 2020/0001641 A1* | 1/2020 | Herren | ............... | B41M 5/0256 |
| 2020/0070558 A1 | 3/2020 | Ciupak | | |

FOREIGN PATENT DOCUMENTS

| | | | | | |
|---|---|---|---|---|---|
| EP | 2536573 | B1 | 5/2014 | | |
| EP | 3006220 | A1 | 4/2016 | | |
| EP | 3590721 | A1 | 1/2020 | | |
| GB | 2547183 | A | 8/2017 | | |
| JP | 202015304 | A | * 1/2020 | ......... | B41M 5/0256 |
| KR | 1020180109155 | A | 10/2018 | | |
| WO | 2019207318 | A1 | 10/2019 | | |

OTHER PUBLICATIONS

Odian et al., "Ceric Ion Initiated Graft Polymerization onto Poly-(vinyl Alcohol)", J. Macromol. Sci.-Chem., 1970, pp. 317-330, vol. A4(2).

Parker et al., "Synthesis of poly(vinyl alcohol-g-4-vinylpyridine hydrochloride) for application as a surfactant in emulsion polymerization of methyl methacrylate", Polymer Bulletin, 1986, pp. 55-58, vol. 16.

* cited by examiner

Fig. 1

Fig. 2

TRANSFER MEDIA FOR TRANSFERRING SUBLIMATION DYES ONTO THREE-DIMENSIONAL SURFACES

CROSS-REFERENCE TO RELATED APPLICATION

This application claims priority to European Patent Application No. 21 156 050.3 filed Feb. 9, 2021, the disclosure of which is hereby incorporated by reference in its entirety.

BACKGROUND OF THE INVENTION

Field of the Invention

The present invention relates to inkjet printable transfer media for transferring a sublimation dye and/or another functional active ingredient to a surface of an article by means of heat in a thermoformable process, to methods for preparing such inkjet printable transfer media and for providing at least a part of a surface of an article with a sublimation dye and/or another functional active ingredient as well as the use of such inkjet printable transfer media in different technical fields.

Description of Related Art

It is often desirable to provide a three-dimensional surface of articles of various technical fields, such as furniture, glassware, sanitary items, electrical appliance, vehicles, plastic parts, wooden parts, footwear, three-dimensional textile surfaces etc., with a high-quality print, e.g., full color print images. Common printing methods are direct printing by hand, water transfer printing (cubic printing) or thermal transfer printing. Dye sublimation printing by inkjet technology has been applied for different applications, particularly in textile printing as well as printing small two-dimensional or three-dimensional objects.

WO 2019/207318 A1 relates to coated sheets for dye transfer printing, whereby the coated sheet is adapted to conform to a three-dimensional surface of an object to be printed onto by stretching of the coating. The coated sheet for dye transfer printing comprises an impervious layer of a crosslinked polymeric layer or a metallic layer on a plastic substrate and an ink receptive coating containing an elastomeric component on the impervious layer.

EP 1 973 749 A1 describes a retransfer intermediate sheet particularly useful for printing on three-dimensional articles. The sheet comprises a substrate which is preferably heat-deformable; a layer comprising amorphous silica, a first, non-dye absorbing polymeric binder and a second, flexible polymeric binder.

EP 2 536 573 A1 refers to an ink transfer medium suitable to receive and transfer an image on a bi-dimensional or tri-dimensional article. The medium comprises a sub-layer of amorphous polyethylene terephthalate, an image receiving coating based on cellulosic fibers, microspheres of methacrylate in a binding system; and a barrier coating based on casein or thin metal. The conformability of the ink transfer medium during vacuum deep drawing before transfer of the dyes is impaired as the deep drawing rate is very limited due to crack formation in the coating.

EP 3 006 220 A1 relates to a media for transferring an image to an object. The media comprises a fibrous sheeting material, which can curve and conform to a three-dimensional object; a thin metal or metalized layer applied onto the sheeting material; and an ink or image layer applied onto the metal layer.

KR 2018/0109155 A describes a sublimation transfer film comprising a substrate layer, an ink absorption layer formed on one surface of the substrate layer and a barrier layer formed on the other surface opposite to the one surface of the substrate layer.

US 2020/0070558 A1 refers to heat transfer sheets for dye sublimation, which comprise a base sheet and a dye sublimation coating on a surface of the base sheet. The dye sublimation coating comprises a plurality of microparticles dispersed in a polymeric binder, wherein the plurality of microparticles includes a mixture of tack-inducing microparticles and oxide microparticles.

All these concepts suffer from several drawbacks in view of complex printing, thermoforming and transfer processes. The transfer media show unstable structures, high retention of the sublimation dyes by the transfer substrate due to a high affinity of the substrate material to the sublimation dyes, or physical entrapment of color particles, poor heat conductivity, or even physical disruption during the heating process. To prevent back diffusion of the dye into the substrate, barrier layers made of metals such as aluminum are applied between the ink absorbing layer and the substrate. However, the rigid and continuous nature of metal in case of aluminum foil is unsatisfactory when it comes to establishing and maintaining close proximity to the object to be printed during thermoforming, especially if the object is curved or spherical. Moreover, the metal layers add substantially to the cost of the transfer media and hinder the view for good positioning of the transfer medium. The known transfer media further show slow drying speed as well as print artefacts during printing or after transfer.

Thus, it is an object of the present invention to provide a simple process preferably at low transfer temperatures for furnishing the surface of a three-dimensional article with colorants or other functional properties, such as abrasion resistance, scratch resistance, water repellency, UV resistance and/or anti-microbial properties as well as to provide the means for carrying out such process. Fast drying of the sublimation ink applied to the transfer medium for direct stack or roll-to-roll printing at high ink loads, as well as high printing speed without sticking of the printed areas are also an object. Another objective of the present invention is to provide a high transfer rate of the sublimation dyes and, at the same time, a high transfer print quality showing a print with a large color gamut without printing artifacts due to migration or vapor pressure of high boiling ink components, especially without gassing or bubbling problems. Furthermore, it is an objective to provide a translucent or transparent transfer medium that allows simplified positioning of the image on the object to be printed. Another objective of the invention is to prevent sticking of the transfer medium during thermoforming and sublimation dye transfer, and to ensure good release of the transfer medium from the object after the transfer. Avoiding cracks in the transfer medium during thermoforming and/or sublimation dye transfer is another object of the present invention. Another objective of the present invention is to provide transfer media that exhibit high compatibility with ink solvents and rapid swelling.

These objects are met by the transfer medium and methods of the present invention.

SUMMARY OF THE INVENTION

The following clauses summarize some aspects of the present invention.

A first aspect of the present invention relates to an inkjet printable transfer medium for transferring a sublimation dye and/or another functional active ingredient to a surface of an article by means of heat in a thermoforming process, wherein the transfer medium comprises a carrier substrate comprising a thermoplastic polymer and a sublimation ink receiving coating comprising (a) at least one sublimation ink receiving layer formed over at least a part of one surface of the carrier substrate, the sublimation ink receiving layer comprising at least (i) a polyvinyl alcohol and (ii) an N-functional group-containing polymer, or (iii) a polyvinyl alcohol containing N-functional groups; and (b) a topcoat layer formed over at least a part of the sublimation ink receiving layer, the topcoat layer comprising (i) polymeric particles and at least one (ii) binder comprising a material selected from the group consisting of polyvinyl alcohol, modified cellulose and combinations thereof.

A second aspect of the present invention relates to the inkjet printable transfer medium according to the first aspect, wherein the thermoplastic polymer is selected from the group consisting of poly(methyl methacrylates) (PMMA), thermoplastic polyurethanes (TPU), polyethersulfones (PES), polyethylene terephthalates (PET), preferably amorphous polyethylene terephthalates (APET), polyethylene terephthalates modified by ethylene glycol (PETG), polybutylene terephthalates (PBT), cast polypropylenes (cPP), polycarbonates (PC), polyvinylchlorides (PVC), copolymeric polyoxymethylenes (POM-C), acrylonitrile butadiene styrenes (ABS), polystyrenes (PS), polyamides (PA), polylactic acids (PLA), cellulose esters, e.g. acetates, copolymers thereof and mixtures thereof.

A third aspect of the present invention relates to the inkjet printable transfer medium according to any one of aspects 1 or 2, wherein the carrier substrate has a thickness in the range of from 75 µm to 500 µm, preferably of from 100 µm to 400 µm, more preferably of from 150 µm to 300 µm.

A fourth aspect of the present invention relates to the inkjet printable transfer medium according to any one of the preceding aspects, wherein the polyvinyl alcohol (a-i) has a saponification degree of from 70% to 99%, preferably of from 86% to 95%.

A fifth aspect of the present invention relates to the inkjet printable transfer medium according to any one of the preceding aspects, wherein the N-functional group-containing polymer (a-ii) or the polyvinyl alcohol containing N-functional groups (a-iii) comprises amino groups, amido groups or a combination thereof.

A sixth aspect of the present invention relates to the inkjet printable transfer medium according to any one of the preceding aspects, wherein the N-functional group-containing polymer (a-ii) is made from a monomer mixture comprising at least a monomer selected from the group consisting of N-vinyl caprolactam, N-vinyl piperidine, N-vinyl pyrrolidone, N-vinyl formamide, alkyl-2-oxazoline, acrylamide, N-vinylacetamide, N,N-dimethylacrylamide, N,N-diethylacrylamide, N-is opropylacrylamide, N,N-dimethylaminopropyl acrylamide, diacetone acrylamide, N-hydroxyethyl acrylamide, N-vinyl-imidazole, N-vinyl pyridine, amino-functional (meth)acrylates or combinations thereof or the polyvinyl alcohol containing N-functional groups (a-iii) is made from a monomer mixture comprising at least a monomer selected from the group consisting of N-vinyl caprolactam, N-vinyl piperidine, N-vinyl pyrrolidone, N-vinyl formamide, acrylamide, N-vinylacetamide, N,N-dimethylacrylamide, N,N-diethylacrylamide, N-isopropylacrylamide, N,N-dimethylaminopropyl acrylamide, diacetone acrylamide, N-hydroxyethyl acrylamide, N-vinyl-imidazole, N-vinyl pyridine, amino-functional (meth)acrylates or combinations thereof.

A seventh aspect of the present invention relates to the inkjet printable transfer medium according to any one of the preceding aspects, wherein the N-functional group-containing polymer (a-ii) comprises a graft polymer comprising N-functional group-containing side chains.

An eighth aspect of the present invention relates to the inkjet printable transfer medium according to any one of the preceding aspects, wherein the N-functional group-containing polymer (a-iii) comprises a polyvinyl alcohol grafted with a N-functional group-containing compound.

A ninth aspect of the present invention relates to the inkjet printable transfer medium according to any one of the preceding aspects, wherein the mass ratio of the polyvinyl alcohol to the N-functional group-containing compound of the polyvinyl alcohol containing N-functional groups (a-iii) is from 1:4 to 20:1, preferably 1:1 to 15:1, more preferably 2:1 to 10:1.

A tenth aspect of the present invention relates to the inkjet printable transfer medium according to any one of the preceding aspects, wherein the mass ratio of the polyvinyl alcohol (a-i) to the N-functional group-containing polymer (a-ii) is from 1:4 to 20:1, preferably 1:1 to 15:1, more preferably 2:1 to 10:1.

An eleventh aspect of the present invention relates to the inkjet printable transfer medium according to any one of the preceding aspects, wherein the sublimation ink receiving layer (a) has a dry coating weight in the range of from 5 g/m² to 40 g/m² preferably of from 8 g/m² to 25 g/m², more preferably of from 10 g/m² to 20 g/m².

A twelfth aspect of the present invention relates to the inkjet printable transfer medium according to any one of the preceding aspects, wherein the sublimation ink receiving coating comprises at least one functional active ingredient which can be transferred from the sublimation ink receiving coating of the transfer medium by means of heat, wherein said functional active ingredient does not represent a sublimation dye having an absorbance maximum at a wavelength $\lambda$max in the region of from 400 to 700 nm of the electromagnetic spectrum.

A thirteenth aspect of the present invention relates to the inkjet printable transfer medium according to any one of the preceding aspects, wherein the sublimation ink receiving layer (a) comprises further additives selected from the group consisting of additional binders, dispersants, softening agents, wetting agents, defoamers, pigments and combinations thereof, the pigments preferably having a mean particle size in the range of 1 µm to 30 µm, preferably of 5 µm to 25 µm, determined by light diffraction method according to ISO 13320:2009.

A fourteenth aspect of the present invention relates to the inkjet printable transfer medium according to any one of the preceding aspects, wherein the polymeric particles (b-i) comprise polyamide, (co)poly(meth)acrylate, (co)polystyrene, polysiloxane, polyurethane, copolymers thereof and combinations thereof, preferably crosslinked (co)poly(meth)acrylate, crosslinked (co)polystyrene, copolymers thereof and combinations thereof.

A fifteenth aspect of the present invention relates to the inkjet printable transfer medium according to any one of the preceding aspects, wherein the polymeric particles (b-i) have a monomodal particle size distribution.

A sixteenth aspect of the present invention relates to the inkjet printable transfer medium according to any one of the preceding aspects, wherein the polymeric particles (b-i) have a mean particle size in the range of from 10 µm to 100

μm, preferably of from 20 μm to 50 μm, determined by confocal laser scanning microscopy.

A seventeenth aspect of the present invention relates to the inkjet printable transfer medium according to any one of the preceding aspects, wherein the topcoat layer (b) comprises 10 to 60 wt.-% of the polymeric particles (i), based on the dry weight of said layer.

An eighteenth aspect of the present invention relates to the inkjet printable transfer medium according to any one of the preceding aspects, wherein the modified cellulose is selected from the group consisting of cellulose esters, cellulose ethers and combinations thereof.

A nineteenth aspect of the present invention relates to the inkjet printable transfer medium according to any one of the preceding aspects, wherein the topcoat layer does not include cellulose fibers.

A twentieth aspect of the present invention relates to the inkjet printable transfer medium according to any one of the preceding aspects, wherein the topcoat layer (b) comprises 40 to 90 wt.-% of the binder (ii), based on the dry weight of said layer.

A twenty-first aspect of the present invention relates to the inkjet printable transfer medium according to any one of the preceding aspects, wherein the polymeric particles (b-i) are present as a monolayer in the topcoat layer.

A twenty-second aspect of the present invention relates to the inkjet printable transfer medium according to the twenty-first aspect, wherein the number of polymeric particles (b-i) in the monolayer of polymeric particles (b-i) having a mean particle size of up to 50 μm, preferably in the range of from 10 μm to 50 μm, more preferably of from 20 μm to 50 μm, is in the range of from 50 polymeric particles per 1 mm$^2$ of the transfer medium to 300 polymeric particles per 1 mm$^2$ of the transfer medium, preferably of from 100 polymeric particles per 1 mm$^2$ of the transfer medium to 200 polymeric particles per 1 mm$^2$ of the transfer medium.

A twenty-third aspect of the present invention relates to the inkjet printable transfer medium according to any one of the twenty-first or twenty-second aspects, wherein the at least one binder (b-ii) at least partially embeds the polymer particles (b-i) in such a way that the polymeric particles (b-i) protrude at least one third of their diameter on the surface of the topcoat layer.

A twenty-fourth aspect of the present invention relates to the inkjet printable transfer medium according to any one of the preceding aspects further comprising one or more additional layer(s), which preferably are positioned between the carrier substrate and the sublimation ink receiving layer and/or over the surface of the carrier substrate opposite the surface over which the sublimation ink receiving coating is formed.

A twenty-fifth aspect of the present invention relates to a method for providing at least a part of a surface of an article with sublimation dye and/or another functional active ingredient comprising: (a) applying at least one sublimation ink comprising a sublimation dye and/or at least another functional active ingredient to the sublimation ink receiving coating of the inkjet printable transfer medium according to any one of the preceding aspects; (b) positioning the transfer medium relative to the article such that the topcoat layer is facing the surface of the article to be provided with a sublimation dye and/or another functional active ingredient; (c) optionally thermoforming the transfer medium to conform with the surface of the article to be provided with the sublimation dye and/or another functional active ingredient; (d) applying heat to the transfer medium to transfer the sublimation dye(s) and/or the functional active ingredient(s) from the sublimation ink receiving coating to at least a part of the surface of the article.

A twenty-sixth aspect of the present invention relates to the method according to the twenty-fifth aspect, wherein the sublimation ink is applied by inkjet printing.

A twenty-seventh aspect of the present invention relates to the method according to any one of the twenty-fifth or twenty-sixth aspects, wherein both a sublimation dye and another functional active ingredient are transferred and wherein the part of the surface provided with the functional active ingredient may be the same as, partially overlapping with or different from the part of said surface provided with the sublimation dye, and wherein the functional active ingredient may be transferred together with the at least the one sublimation dye in step (d) or before or after the at least one sublimation dye is transferred.

A twenty-eighth aspect of the present invention relates to the method according to any one of the twenty-fifth to twenty-seventh aspects, wherein the temperature applied in step (c) and/or (d) is independently selected to be in the range of from 100° C. to 220° C., preferably from 110° C. to 200° C., more preferably from 130° C. to 180° C., even more preferably from 140° C. to 170° C.

A twenty-ninth aspect of the present invention relates to the method according to any one of the twenty-fifth to twenty-eighth aspects, wherein heat in step (c) and/or (d) is applied for 1 min to 10 min, preferably for 1 min to 6 min.

A thirtieth aspect of the present invention relates to the method according to any one of the twenty-fifth to twenty-ninth aspects, wherein the surface of the article to be provided with a sublimation dye and/or another functional active ingredient comprises a polymeric material; and/or wherein the article is selected from the group consisting of textiles and leatherware, including clothing and footwear; bottles; ceramics; luggage items; pieces of furniture and home decor articles; glassware and crockery; household appliances; tools, sanitary items; medical equipment and tools; prosthetics; electrical appliances, including computers and mobile phones; vehicles, including automobiles, motorcycles, bicycles, ships and aircrafts; buildings; toys, jewelries and watches; protective helmets; accessories for and parts of the aforementioned articles; as well as packaging, wrappings and covers, including protective covers.

A thirty-first aspect of the present invention relates to the method according to any one of the twenty-fifth to thirtieth aspects, wherein the article comprises a thermoplastic material which is formed into a desired shape while the article and the transfer medium facing the article are heated in step (c) and/or step (d).

A thirty-second aspect of the present invention relates to a use of an inkjet printable transfer medium according to any one of the first to twenty-fourth aspects or a method according to any one of the twenty-fifth to thirty-first aspects for providing at least a part of a surface of an article with a sublimation dye and/or another functional active ingredient in the field of packaging, including packaging of food; electronics, including consumer electronics; machinery, device and equipment manufacturing; toolmaking; architecture and construction; decoration, including interior decoration; or advertising; or in the domestic or sanitary appliance, automotive, aerospace or textile and clothing industry.

A thirty-third aspect of the present invention relates to a method for preparing an inkjet printable transfer medium according to any one of the first to twenty-fourth aspects which comprises forming the sublimation ink receiving coating over at least a part of one surface of the carrier substrate by: (a) applying a composition comprising at least (i) a polyvinyl alcohol and (ii) a N-functional group-containing polymer or a polyvinyl alcohol containing N-functional groups (iii) over at least a part of one surface of a carrier substrate to form a sublimation ink receiving layer; (b) optionally drying the coating formed in step (a); (c) applying a composition comprising (i) polymeric particles and at least one (ii) binder comprising a material selected from the group consisting of polyvinyl alcohol, modified cellulose and combinations thereof over at least a part of the sublimation ink receiving layer to form a topcoat layer; and (d) drying the coating formed in step (c) or steps (a) and (c).

DESCRIPTION OF THE INVENTION

The present invention relates to an inkjet printable transfer medium for transferring a sublimation dye and/or another functional active ingredient to a surface of an article by means of heat in a thermoforming process. The transfer medium comprises a carrier substrate comprising a thermoplastic polymer; and a sublimation ink receiving coating. Said sublimation ink receiving coating comprises (a) at least one sublimation ink receiving layer formed over at least a part of one surface of the carrier substrate; and (b) a topcoat layer formed over at least a part of the sublimation ink receiving layer. According to the invention, the sublimation ink receiving layer (a) comprises at least (i) a polyvinyl alcohol and (ii) a N-functional group-containing polymer, or (iii) a polyvinyl alcohol containing N-functional groups, and the topcoat layer (b) comprises (i) polymeric particles and at least one (ii) binder comprising a material selected from the group consisting of polyvinyl alcohol, modified cellulose and combinations thereof. The polyvinyl alcohol (i) of the sublimation ink receiving layer (a) is not the same as the polyvinyl alcohol of the topcoat layer (b). The sublimation ink receiving layer and the topcoat layer are distinct layers of different composition.

Thermoplastic polymers include, but are not limited to, acrylic polymers, some polyesters and polyurethanes, nylon, polylactic acids, polybenzimidazoles, polycarbonates, polyether sulfones, polyoxymethylenes, polyetherether ketones, polyetherimides, polyethylenes, polyphenylene oxides, polyphenylene sulfides, polypropylenes, polystyrenes, polyvinyl chlorides, and polytetrafluoroethylenes as well as their copolymers and mixtures thereof. Preferably, the thermoplastic polymer may be selected from the group consisting of poly(methyl methacrylates) (PMMA), thermoplastic polyurethanes (TPU), polyethersulfones (PES), polyethylene terephthalates (PET), preferably amorphous polyethylene terephthalates (APET), polyethylene terephthalates modified by ethylene glycol (PETG), polybutylene terephthalates (PBT), cast polypropylenes (cPP), polycarbonates (PC), polyvinylchlorides (PVC), copolymeric polyoxymethylenes (POM-C), acrylonitrile butadiene styrenes (ABS), polystyrenes (PS), polyamides (PA), polylactic acids (PLA), cellulose acetates, e.g. acetates, copolymers thereof and mixtures thereof. The carrier substrate typically has a thickness being in the range of from 75 µm to 500 µm, preferably of from 100 µm to 400 µm, more preferably of from 150 µm to 300 µm. Accordingly, transfer media according to the present invention are easily thermoformable while having a rigid structure.

As used herein, the term "sublimation ink receiving coating" refers to a coating provided over the carrier substrate which is capable of receiving a sublimation ink and later on releasing the sublimation dye and/ or another functional active ingredient upon the application of heat and optionally pressure. The sublimation ink receiving coating comprises (a) at least one sublimation ink receiving layer formed over at least a part of one surface of the carrier substrate; and (b) a topcoat layer formed over at least a part of the sublimation ink receiving layer.

As used herein, the term "over" as in "formed over" means that, e.g., the sublimation ink receiving layer may be in direct contact with the carrier substrate or one or more additional layers, including, but not limited to, further sublimation ink receiving layers, and/or primer layers, may be present between the carrier substrate and the sublimation ink receiving layer.

Typically, the polyvinyl alcohol (a-i) may have a saponification degree of from 70% to 99%, preferably of from 86% to 95%. As used herein, the term "saponification degree" refers to the ratio of a hydroxyl group with respect to the total number of the hydroxyl group and a carbonyloxy group such as an acetyloxy group in the polyvinyl alcohol. The saponification degree has to be understood as an average value meaning that mixtures of less hydrolyzed and more hydrolyzed polyvinyl alcohols can be used. Suitable examples of polyvinyl alcohol (a-i) include, but are not limited to, Poval grades, e.g. Poval 4-98, Poval 4-88, Poval 26-88, Poval 30-92 or 28-99, available from Kuraray (Japan). The polyvinyl alcohol (a-i) is typically present in an amount in the range of from 30 to 90 wt.-%, preferably 35 to 85 wt.-%, more preferably from 50 to 80 wt.-%, based on the dry weight of the sublimation ink receiving layer.

According to the present invention, the N-functional group-containing polymer (a-ii) or the polyvinyl alcohol containing N-functional groups (a-iii) may comprise amino groups, amido groups or a combination thereof. Suitable N-functional group-containing polymers (a-ii) may be made from a monomer mixture comprising at least a monomer selected from the group consisting of N-vinyl caprolactam, N-vinyl piperidine, N-vinyl pyrrolidone, N-vinyl formamide, alkyl-2-oxazoline, acrylamide, N-vinylacetamide, N,N-dimethylacrylamide, N,N-diethylacrylamide, N-isopropylacrylamide, N,N-dimethylaminopropyl acrylamide, diacetone acrylamide, N-hydroxyethyl acrylamide, N-vinylimidazole, N-vinyl pyridine, amino-functional (meth)acrylates or combinations thereof. Polyvinyl alcohol containing N-functional groups (a-iii) may be made from a monomer mixture comprising at least a monomer selected from the group consisting of N-vinyl caprolactam, N-vinyl piperidine, N-vinyl pyrrolidone, N-vinyl formamide, acrylamide, N-vinylacetamide, N,N-dimethylacrylamide, N,N-diethylacrylamide, N-isopropylacrylamide, N,N-dimethylaminopropyl acrylamide, diacetoneacrylamide, N-hydroxyethyl acrylamide, N-vinyl-imidazole, N-vinyl pyridine, amino-functional (meth)acrylates or combinations thereof. The N-functional group containing polymers provide good absorption properties of sublimation ink components, e.g. glycols or glycerol.

Suitable examples of N-functional group-containing polymer (a-ii) include, but are not limited to, Polyethyloxazoline Ultroxa® polymers available from Sigma Aldrich and Aquazol polymers available from Cameo as well as polyvinylpyrrolidone or copolymers thereof, e.g with vinylacetate, provided, e.g., as Luvitec PVP K 90 by BASF (Germany). The N-functional group-containing polymer (a-ii) is typically present in an amount in the range of from 5 to 40 wt.-%, preferably from 10 to 35 wt.-%, more preferably from 15 to 30 wt.-%, based on the dry weight of the sublimation ink receiving layer.

Suitable examples of polyvinyl alcohol containing N-functional groups (a-iii) include, but are not limited to Gohsenx K-series, e.g. K 434, a cationic modified PVA available from Nippon Gohsei (Japan). The polyvinyl alcohol containing N-functional groups (a-iii) is typically present in an amount in the range of from 40 to 95 wt.-%, preferably 50 to 90 wt.-%, more preferably from 55 to 85 wt.-%, based on the dry weight of the sublimation ink receiving layer.

The sublimation ink receiving layer may comprise mixtures of polyvinyl alcohols, which can be advantageous for optimizing, e.g., water sensitivity, viscosity, solubility and coating process parameter.

According to the present invention, the mass ratio of the polyvinyl alcohol (a-i) to the N-functional group-containing polymer (a-ii) may be from 1:4 to 20:1, preferably 1:1 to 15:1, more preferably 2:1 to 10:1. Said mass ratios of the polyvinyl alcohol (a-i) to the N-functional group-containing polymer (a-ii) may be beneficial for inkjet printable transfer media to be thermoformable and have good absorption properties of sublimation ink components.

Preferably, the N-functional group-containing polymer (a-ii) or the N-functional group-containing polymer (a-iii) comprises a graft polymer comprising N-functional group-containing side chains. The graft polymer comprising N-functional group containing side chains may be prepared by polymerizations methods known in the art. Suitable examples and polymerization methods to prepare graft polymers comprising N-functional group containing side chains include, but are not limited to, those, discussed in US 2002/0198328 A1, Odian et al., J. Macromol. Sci.-Chem., 1970, A4(2), 317-330; and Parker, et al., Polymer, 1986, 16, 55-58.

Moreover, the N-functional group-containing polymer (a-iii) preferably may comprise a polyvinyl alcohol grafted with a N-functional group-containing compound. The graft base used for the polyvinyl alcohol grafted with a N-functional group-containing compound (a-iii) according to the invention typically is a polyvinyl alcohol, preferably a polyvinyl alcohol having a saponification degree of from 70% to 99%, more preferably of from 80% to 95%. Typically, the polyvinyl alcohol grafted with an N-functional group-containing compound (a-iii) is prepared by using free-radical chain starters. The reactive radicals are formed during their decomposition caused by heat or by the introduction of reducing agents. These initiator systems may be organic peroxides and hydroperoxides in amounts of 0.1 to 3 wt.-%, preferably in combination with suitable reducing agents in amounts of 0.05 to 3 wt.-%, the weight percent being based on the total weight of the monomers. A suitable example of an initiator system include, but is not limited to, tert-butyl hydroperoxide in combination of sodium formaldehyde sulfoxylate, sodium sulfite, sodium hydrogen sulfite or dithionite. The graft reaction can also be caused by direct polyvinyl alcohol radical formation by CeIV ions, such as ceric ammonium sulfate or ceric nitrate; by MnIII ions, such as dimanganese trisulfate in the presence of sulfuric acid or manganese triacetate; by FeIII ions, or by potassium permanganate. Suitable monomers to polymerize onto the polyvinyl alcohol backbone may be selected from the group as described above consisting of N-vinyl caprolactam, N-vinyl piperidine, N-vinyl pyrrolidone, N-vinyl formamide, acrylamide, N-vinylacetamide, N,N-dimethylacrylamide, N,N-diethylacrylamide, N-isopropylacrylamide, N,N-dimethylaminopropyl acrylamide, diacetone acrylamide, N-hydroxyethyl acrylamide, N-vinyl-imidazole, N-vinyl pyridine, amino-functional (meth)acrylates or combinations thereof. The mass ratio of the polyvinyl alcohol to the N-functional group-containing compound of the N-functional group-containing polymer (a-iii) may be from 1:4 to 20:1, preferably 1:1 to 15:1, more preferably 2:1 to 10:1. Suitable examples and polymerization methods to prepare polyvinyl alcohol grafted with a N-functional group-containing compound (a-iii) include those, but are not limited to those, discussed in Mino et al., J. Poly. Sci., 1958, 122, 242-243; Odian et al. J. Macromol. Sci.-Chem., 1970, A4(2), 317-330; and Parker et al., Polymer, 1986, 16, 55-58.

Typically, the sublimation ink receiving layer (a) may have a dry coating weight in the range of from 5 $g/m^2$ to 40 $g/m^2$, preferably of from 8 $g/m^2$ to 25 $g/m^2$, more preferably of from 10 $g/m^2$ to 20 $g/m^2$. The dry coating weight is measured gravimetrically. The inkjet printable transfer media according to the present invention may prevent blocking or smearing after being printed and rolled. The dry coating weights as described above may be beneficial for optimizing to prevent the blocking and smearing in the printed roll.

The sublimation ink receiving coating, e.g. the sublimation ink receiving layer (a) and/or the topcoat layer (b), may comprise at least one functional active ingredient which can be transferred from the sublimation ink receiving coating of the transfer medium by means of heat, wherein said functional active ingredient does not represent a sublimation dye having an absorbance maximum at a wavelength λmax in the region of from 400 to 700 nm of the electromagnetic spectrum.

The term "functional active ingredient" in context of the present invention refers to a substance that imparts one or more functional characteristics to a surface when deposited thereon and/or incorporated therein, which is not a sublimation dye as defined further below and which can be transferred to the surface of an article by means of heat and optionally pressure. For example, such desirable properties may include abrasion resistance, scratch resistance, water repellency, UV resistance, electrical conductivity, electrical insulation, printability, weather resistance, oxidation resistance, non-stick/anti-adhesive properties, temperature resistance, oil-repellent properties, dirt-repellent properties, antimicrobial properties, etc. At atmospheric pressure (1.01325× 105 $N/m^2$) the functional active ingredient preferably has a transfer temperature of from 80° C. to 240° C., more preferably of from 90° C. to 220° C., and most preferably of from 120° C. to 180° C.

As used herein, the term "transfer temperature" refers to a temperature specific for each substance at the applied pressure where said substance starts to leave the transfer medium, most likely due to solid, liquid, sublimation or evaporation transfer. Preferably, the functional active ingredient of the present invention is a solid at room temperature (23° C.) and atmospheric pressure. As it is further described below, the functional active ingredient may be incorporated into the sublimation ink receiving coating during its formation over the carrier substrate or it may be incorporated into a preformed sublimation ink receiving coating.

The functional active ingredients may preferably be selected from the group consisting of bactericides, pesticides, such as herbicides, fungicides or insecticides, antifouling agents, further preservatives, water repellents, oil repellents, dirt repellents, UV stabilizers, antioxidant agents, luminescent agents, brightening agents, reflective agents, polarizing agents, conductive agents, antistatic agents, slip or anti-slip agents, anti-blocking agents, nonstick agents, lubricants, soft touch agents, flavors, fragrances, flame retardants, scratch- and mar-resistant agents, wetting agents, adhesion promoters, sizing agents, roughening agents and mixtures thereof.

Examples of suitable UV stabilizers include e.g. oxanilides, benzotriazoles, and hydroxy benzophenones, such as, for instance Hostavin 3310 (Clariant, Switzerland). Examples of suitable water, oil and dirt repellents include e.g. fluorinated compounds, for instance fluorocarbon resins such as those commercially available under the designation Oleophobol® from Huntsman, Germany, e.g. Oleophobol® 7752. Examples of wetting agents include e.g., Byk 333 (BYK Additives & Instruments, Germany) or Worlée (Worlée-Chemie GmbH; Germany); examples of suitable brightening agents include e.g. Tinuvin OB (BASF, Germany); examples of suitable antioxidant agents include e.g. Irganox 1010 (BASF, Germany); and examples of suitable bactericides include Sanitized T99-19 (Sanitized, Switzerland).

A sublimation dye typically has an absorbance maximum in the visible range, preferably at a wavelength λ max in the region of from 400 to 700 nm of the electromagnetic spectrum. The absorbance maximum of a sublimation dye can be determined using standard techniques known in the art, e.g., scanning a solution of the dye in a quartz cuvette with a Varian Cary 50 Bio UV-Visible spectrophotometer and the software Varian UV Cary Scan 3.00 (303). The solvent depends on the particular dye to be measured; common solvents include e.g., water, ethanol, toluene, methylene chloride, chloroform, tetrahydrofuran, or dimethylformamide.

Sublimation dyes which can be used with the inkjet printable transfer medium of the present invention include those commonly known in the art, such as, but are not limited to, azo dyes, nitro dyes, anthraquinone dyes, quinoline dyes, basic dyes such as triarylmethane dyes, e.g., fluoran dyes, and oil soluble dyes. The sublimation dye of the present invention may have a transfer temperature being in the range of from about 80° C. to about 240° C., preferably of from about 90° C. to about 220° C., and even more preferably of from about 120° C. to about 180° C.

In terms of the present invention, the sublimation dye may be provided as a sublimation ink. The term "sublimation ink" refers to a composition comprising a sublimation dye in a liquid carrier which is suitable to be applied to a substrate, e.g., the inkjet printable transfer medium of the present invention, by a printing technique, e.g., by ink jet printing. The sublimation dye usually is a solid at room temperature and is dispersed in the liquid carrier of the sublimation ink. Sublimation inks are well known in the art and comprise water-based and organic solvent-based inks, including oil-based inks. More commonly, water-based sublimation inks are used. Sublimation inks and printers for applying them to transfer media are commercially available, e.g., from Mimaki Engineering Co. (Nagano, Japan) or from Epson, e.g., Sure Color T3200, e.g., with dye sublimation inks from Sun Chemical Corporation (USA), e.g., Elvajet Opal type inks. Further suitable examples of sublimation inks include, but are not limited to, 3-hydroxy-2-(3-hydroxy-2-quinolyl)-1H-inden-1-one (Disperse Yellow 54), N,N-diethyl-3-methyl-4- [2-5-nitro-1,3-thiazol-2-yl)diazen-1-yl] aniline (Disperse Blue 360), 1-Hydroxy-4-(p-toluidino)anthraquinone (Disperse Blue 72), 1-amino-4-(ethylamino)-9,10-dihydro-9,10-dioxoanthracene-2-carbonitrile (Disperse Blue 359), all available from Alfa Chemistry (USA) as well as 1-amino-4-hydroxy-2-phenoxyanthraquinone (Disperse Red 60), 1,5-diaminobromo-4,8-dihydroxyanthraquinone (Disperse Blue 56), 1,4-Bis(methylamino)anthraquinone (Disperse Blue 14), all available from Sigma Aldrich.

The sublimation ink receiving layer (a) of the present invention may comprise further additives. Suitable additives may be selected from the group consisting of additional binders, dispersants, softening agents, wetting agents, defoamers, pigments and combinations thereof.

Suitable additional binders for use in a sublimation ink receiving layer are known in the art and include naturally occurring as well as synthetic polymers which may be soluble or insoluble in water at room temperature. It may be preferred to use a mixture of different polymers, including naturally occurring as well as synthetic polymers some of which may be soluble in water at room temperature, while others are not. Such polymers include, but are not limited to, casein, gelatin, sodium alginates, chitosans, starches, cellulose esters and ethers, polystyrenes, (meth)acrylic polymers, polyurethanes, polyvinylpyrrolidone and polyvinyl acetates as well as copolymers thereof.

In terms of the present invention, the term "pigment" is used as known in the art of papermaking and refers to fine particles used in a coating which, in contrast to a dye, do not necessarily impart a color to the coating. Pigments suitable for the sublimation ink receiving layer of the transfer medium of the present invention include inorganic particles and organic polymer particles and preferably a combination thereof. The pigment may be porous or non-porous. A combination of porous and non-porous pigments may also be used. As used herein the term "porous" refers to a material which is permeable such that fluids are able to enter the material by way of pores or other passages. The term "porous" further refers to material that have a total pore volume of 0.5 to 1.8 mL/g determined according to ISO 15901-1:2016. Suitable pigments include silica, including amorphous silica, calcined silica, precipitated silica and fumed silica, aluminum oxides and hydroxides, clays, including kaolin and calcined clay, zeolites, calcium carbonate, talc, titanium dioxide, diatomaceous earth, porous glass; polymeric particles preferably having a melting point above 100° C., e.g. (co)poly(meth)acrylates or (co)polyamides such as the (co)polyamide powders available under the designation ORGASOL from Arkema, Colombes, France. The pigments of the present invention preferably may have a mean particle size in the range of 1 µm to 30 µm, more preferably of 5 µm to 25 µm, as determined by light diffraction method according to ISO 13320:2009.

According to the invention, the topcoat layer (b) comprises (i) polymeric particles and at least one (ii) binder comprising a material selected from the group consisting of polyvinyl alcohol, modified cellulose and combinations thereof.

The polymeric particles (b-i) may be prepared by syntheses known in the art, such as emulsion polymerization, dispersion polymerization or by precipitation techniques. Suitable polymeric particles (b-i) may comprise polyamide, (co)poly(meth)acrylate, (co)polystyrene, polysiloxane, polyurethane, copolymers thereof and combinations thereof, preferably crosslinked (co)poly(meth)acrylate, crosslinked (co)polystyrene, copolymers thereof and combinations thereof. Polymer particles comprising crosslinked (co)poly(meth)acrylate, crosslinked (co)polystyrene, copolymers thereof and combinations thereof do not adhere to the surface of an article to be provided with a sublimation dye and/or at least another functional active ingredient during the transfer process. Suitable examples of polymeric particle (b-i) include, but are not limited to, Orgasol ultrafine polyamide powders/polymers and copolymers of lauryllactam (PA12) and/or caprolactam (PA6), which are available from Arkema (France), Techpolymer microspheres, e.g. grades of the MBX series, which is based on crosslinked polystyrene or copolymers of methyl methacrylate and styrene (MSC/

SMX series), available from Sekisui Plastics Europe BV (Netherlands), Dynoadd beads, e.g. Dynoadd P-series, available from Dynea (Norway), Decosphaera based on aliphatic polyurethanes, e.g. Decosphaera 30F available from Suplicolori (Italy), and Tospearl, based on polymethylsilsquioxane, e.g. Tospearl 1100FL and Tospearl 1110A available from Momentive Performance Materials (USA).

According to the present invention, the polymeric particles (b-i) may have a mean particle size in the range of from 10 µm to 100 µm, more preferably of from 20 µm to 50 µm, determined by confocal laser scanning microscopy further described below.

Preferably, the polymeric particles (b-i) may have a monomodal particle size distribution. The term "monomodal particle size distribution" as used herein refers to a particle size distribution, wherein at least 90%, preferably at least 95%, of the polymeric particles have a size within a distribution of 10%, preferably 7%, more preferably 5%, even more preferably 2% around the maximum of the particle size distribution. As described above, the particle size is determined by confocal laser scanning microscopy. A monomodal particle size distribution ensures a constant distance between the surface of an article to be provided with a sublimation dye and/or at least another functional active ingredient and the sublimation dye and/or at least another functional active ingredient applied to the sublimation ink receiving coating of the inkjet printable transfer medium during sublimation. This results in good air extraction during thermoforming and no air bubbles between the surface and the transfer medium.

According to the present invention, the polymeric particles (b-i) as described above preferably are present as a monolayer in the topcoat layer. As used herein, the term "monolayer" refers to a single layer of the polymeric particles in the topcoat layer formed over at least a part of the surface of the sublimation ink receiving layer, where the monolayer height is only one polymeric particle. Accordingly, no identical polymeric particles lie on top of each other in the monolayer. The monolayer of polymer particles in the topcoat layer provides a constant distance between the surface of an article to be provided with a sublimation dye and/or at least another functional active ingredient and the sublimation dye and/or at least another functional active ingredient applied to the sublimation ink receiving coating of the inkjet printable transfer medium during sublimation.

Preferably, the number of polymeric particles (b-i) in the monolayer of polymeric particles (b-i) is in the range of from 50 polymeric particles per 1 mm$^2$ of the transfer medium to 300 polymeric particles per 1 mm$^2$ of the transfer medium, more preferably of from 100 polymeric particles per 1 mm$^2$ of the transfer medium to 200 polymeric particles per 1 mm$^2$ of the transfer medium. Herein, the mean particle size of said polymeric particles (b-i) of the monolayer preferably may be of up to 50 µm, preferably in the range of from 10 µm to 50 µm, more preferably of from 20 µm to 50 µm. It is advantageous that the transfer medium according to the present invention may provide a constant distance between the surface of an article to be provided with a sublimation dye and/or at least another functional active ingredient and the sublimation dye and/or at least another functional active ingredient applied to the sublimation ink receiving coating of the inkjet printable transfer medium over the entire surface of the article, even if the transfer medium softens.

The term "modified cellulose" refers to chemical modifications of the functional groups, mainly hydroxyl groups, in the cellulose backbone including oxidation, esterification, etherification, urethanization, amidation and non-covalent modifications. The modified cellulose can be selected from, without being limited to, the group consisting of cellulose esters, cellulose ethers and combinations thereof. As used herein, cellulose ethers include alkyl ethers, such as, for instance, methyl cellulose, ethyl cellulose or ethyl methyl cellulose, hydroxyalkyl cellulose ethers, such as, for instance hydroxyethyl cellulose and hydroxypropyl cellulose, carboxyalkyl cellulose ethers, such as, for instance, carboxymethyl cellulose, as well as mixtures and mixed derivatives thereof, such as, for instance, hydroxyethyl methyl cellulose, hydroxypropyl methyl cellulose and ethyl hydroxyethyl cellulose.

Preferably, the topcoat layer (b) does not include cellulose fibers. The term "cellulose fibers" as used herein refers to a bundle cellulose where the cellulose molecules are laterally stabilized by hydrogen bonding between the hydroxyl groups. The cellulose fibers may also contain hemicellulose and lignin, with different percentages of these components. Typically, cellulose fibers are obtained from wood, crops such as flax, cotton, hemp, sisal and others, especially from by-products of different plants such as corn, wheat, rice, sorghum, barley, sugar cane, pineapple, bananas and coconut crops.

According to the present invention, the topcoat layer (b) may comprise from 10 to 60 wt.-% of the polymeric particles (i), preferably from 15 to 55 wt.-% of the polymeric particles (i), more preferably from 20 to 50 wt.-% of the polymeric particles (i), based on the dry weight of said layer. The topcoat layer (b) of the present invention may comprise from 40 to 90 wt.-% of the binder (ii), preferably from 45 to 85 wt.-% of the binder (ii), more preferably from 50 to 80 wt.-% of the binder (ii), based on the dry weight of said layer. Said weight percentages of the polymeric particles (b-i) are advantageous since the polymer particles may form a monolayer and protrude on the surface of the topcoat layer (b), but at the same time are sufficiently embedded in the at least one binder (b-ii).

The topcoat layer (b) of the present invention may comprise further additives. Suitable additives may be selected from the group consisting of additional binders, dispersants, softening agents, wetting agents, defoamers, pigments and combinations thereof as described for the sublimation ink receiving layer described above.

Preferably, the at least one binder (b-ii) at least partially embeds the polymer particles (b-i) in such a way that the polymeric particles (b-i) protrude at least one third of their diameter on the surface of the topcoat layer. For example, a particle having a diameter of 30 µm may protrude at least 10 µm on the surface of the topcoat layer. As used herein, the term "embed" means that the binder (b-ii) completely surrounds the polymer particles (b-i), whereas the term "protrude" as used herein means that the shape of the polymer particles is microscopically visible. The protrusion of the polymer particles in the topcoat layer is determined by confocal laser scanning microscopy further described below.

The inkjet printable transfer medium of the present invention may further comprise one or more additional layer(s). Said additional layer(s) may for instance be positioned between the carrier substrate and the sublimation ink receiving coating. Alternatively or in addition, such additional layer(s) may be positioned over the surface of the carrier substrate opposite the surface over which the sublimation ink receiving coating is formed. Examples of such additional layers include primer layers, barrier layers and layers for improving the heat distribution in the transfer medium.

A primer layer may be used to improve the adhesion between two layers, e.g., between the carrier substrate and the sublimation ink receiving coating, if positioned between them. If present, the primer layer preferably may have a thickness ranging of from 2 to 15 μm. Examples of a suitable primer layer include, e.g., self-cros slinking acrylic emulsion polymers, such as Neocryl XK98 (DSM, the Netherlands).

One or more barrier layers may be included in the inkjet printable transfer medium of the present invention to prevent migration of the sublimation dye and, if present, of the functional active ingredient, into or through the carrier substrate during the thermal transfer process. If present, a barrier layer may be positioned between the carrier substrate and the sublimation ink receiving coating and/or over the surface of the carrier substrate opposite the surface over which the sublimation ink receiving coating is formed. A barrier layer may comprise a metal applied onto a polymer layer, such as e.g., metallized polyethylene terephthalate (PET). Preferably, the inkjet printable transfer medium does not comprise a barrier layer.

In order to ensure a fast and even distribution of heat over the whole area of the transfer medium, a flexible metal layer may be included in the transfer medium of the present invention. The flexible metal layer may be applied over the surface of the carrier substrate opposite the surface over which the sublimation ink receiving coating is formed or over the surface of the carrier substrate the sublimation ink receiving coating is applied. For instance, such a flexible metal layer may be included by metallizing the respective surface of the carrier material by e.g., physical or chemical vapor deposition (PVD, CVD) or by laminating g a thin flexible metal foil in the transfer medium e.g., by means of an adhesive layer or a primer layer. The metal layer may comprise e.g., aluminum.

Using the transfer medium and methods of the present invention, a sublimation dye and, if present, another functional active ingredient, being present on the sublimation ink receiving coating are transferred to the surface of an article, but not the whole layer. Accordingly, the transfer medium of the present invention typically does not include a release layer, such as e.g., a silicone coating, to facilitate release of a layer from an underlying layer.

The transfer medium of the present invention may comprise more than one sublimation ink receiving layer, i.e., it may comprise one or more additional sublimation ink receiving layers. If present, the additional sublimation ink receiving layers are located on the same side of the carrier substrate as the sublimation ink receiving coating and preferably are positioned below and/or above the first sublimation ink receiving layer (a) without any other intermediate layers in between.

As used herein, the term "thermoforming process" refers to a process where the transfer medium is heated to an appropriate forming temperature and formed to a specific shape which is preferably adapted to the shape of the article to be provided with the sublimation dye and/or functional active ingredient. Accordingly, the transfer medium of the present invention preferably may be thermoformable, i.e., it becomes pliable or moldable above a specific temperature (the softening point) and re-solidifies upon cooling without crack formation of the sublimation ink receiving coating. This allows the transfer medium to be stretched and formed into a desired shape, e.g., adapted to the shape of the article to be provided with the sublimation dye and/or another functional active ingredient, with the aid of reduced pressure, increased pressure and/or mechanical force. This allows an even more precise and accurate transfer of the sublimation dye and, if present, functional active ingredient to the surface of article having a three-dimensional shape and/or textured surface.

Further, the present invention relates to a method for preparing an inkjet printable transfer medium of the present invention as described above. The method comprises forming the sublimation ink receiving coating over at least a part of one surface of the carrier substrate. Accordingly, the method of the present invention includes the steps of applying a composition comprising at least (i) a polyvinyl alcohol and (ii) a N-functional group-containing polymer or a polyvinyl alcohol containing N-functional groups (iii) over at least a part of one surface of a carrier substrate to form a sublimation ink receiving layer; applying a composition comprising (i) polymeric particles and at least one (ii) binder comprising a material selected from the group consisting of polyvinyl alcohol, modified cellulose and combinations thereof over at least a part of the sublimation ink receiving layer to form a topcoat layer; and drying the coating formed in the previous steps. Optionally, the coating formed by applying the above-described composition to form a sublimation ink receiving layer may be dried before applying the above-described omposition to form a topcoat layer, which is subsequently dried.

Suitable components such as, e.g., thermoplastic polymers, N-functional group containing polymers (a-i), polyvinyl alcohol containing N-functional groups, polymeric particles as well as further additives that may be incorporated into the coating composition have already been described above. These components are provided, i.e., dissolved, dispersed or suspended, in a solvent or mixture of solvents. Suitable solvents include water, organic solvents and a mixture thereof.

A typical coating composition for forming a sublimation ink receiving layer according to the present invention may comprise e.g. a mixture of from about 50 to about 100 wt.-% water and from about 0 to about 50 wt.-% of one or more alcoholic solvents, including, but not being limited to, one or more of methanol, ethanol, and isopropanol, preferably from about 80 to about 98 wt.-% water and from about 2 to about 20 wt.-% of one or more the alcoholic solvents, based on the total amount of both water and organic solvents. The combined amount of water and organic solvents in the coating composition typically ranges from about 10 to about 95 wt.-%, preferably from about 20 to about 90 wt.-%, and more preferably from about 25 to about 85 wt.-%, based on the total weight of the coating composition.

The preferred amount of a polyvinyl alcohol (a-i) and a N-functional group containing polymer (a-ii) or a polyvinyl alcohol containing N-functional groups (a-iii) and further additives, if present, in such a coating composition follow from their preferred amounts in the sublimation ink receiving layer as discussed above. Typical coating compositions for preparing a sublimation ink receiving layer in accordance with the present invention are shown in Table 1.

TABLE 1

| Coating Compositions for Preparing a Sublimation Ink Receiving Layer | | |
|---|---|---|
| Component | wt.-% | wt.-% |
| Solvents (water, ethanol) | 60.0-90.0 | 60.0-90.0 |
| Polyvinyl alcohol (i) | 7.0-15.0 | — |
| N-functional group containing polymer (ii) | 0.3-15.0 | — |
| Polyvinyl alcohol containing N-functional groups (iii) | — | 3.0-25.0 |

TABLE 1-continued

Coating Compositions for Preparing a Sublimation Ink Receiving Layer

| Component | wt.-% | wt.-% |
|---|---|---|
| Organic pigments (e.g., polyamide) | 1-5 | 1-5 |
| Inorganic pigments (silica) | 0.1-5 | 0.1-5 |
| Further additives (e.g., anti-foaming agent, levelling agent, surfactant) | 0.5-2.0 | 0.5-2.0 |
| Total | 100 | 100 |

A typical solvent (mixture) for the coating composition for forming a topcoat layer according to the present invention may comprise e.g. a mixture of from about 50 to about 100 wt.-% water and from about 0 to about 50 wt.-% of one or more alcoholic solvents, including, but not being limited to, one or more of methanol, ethanol, isopropanol, and glycerol, preferably from about 80 to about 98 wt.-% water and from about 2 to about 20 wt.-% of one or more the alcoholic solvents, based on the total amount of both water and organic solvents. The combined amount of solvents in the coating composition typically ranges from about 10 to about 95 wt.-%, preferably from about 20 to about 90 wt.-%, and more preferably from about 25 to about 85 wt.-%, based on the total weight of the coating composition.

The preferred amount of polymeric particles (b-i) and the at least one binder (b-ii) comprising a material selected from the group consisting of polyvinyl alcohol, modified cellulose and combinations thereof in such a coating composition follow from their preferred amounts in the topcoat layer as discussed above. A typically coating composition for preparing a topcoat layer in accordance with the present invention is shown in Table 2.

TABLE 2

Coating Composition for Preparing a Topcoat Layer

| Component | wt.-% |
|---|---|
| Solvents (water, ethanol) | 85.0-95.0 |
| Polymeric particles | 2.0-6.0 |
| Binder (ii) | 4.0-9.0 |
| Further additives (e.g., wetting agent, defoamer) | 0.1-0.8 |
| Total | 100 |

The sublimation ink receiving layer coating composition and/or the topcoat layer coating composition may be applied by usual methods known in the art, including, but not limited to, rolling, spraying, curtain coating, brushing, dipping, air knife coating, Mayer rod coating, gravure coating, slot or slide die coating or a combination thereof.

Drying of the coating composition is provided at room temperature or at an elevated temperature, ranging e.g. from 30° C. to 100° C., optionally using forced air drying. It will be understood that the optimum temperature and duration of the drying step depends on the particular coating, e.g. its solvent content. The temperature of the transfer media in the drying step(s) is/are usually below the glass transition temperature of the carrier substrate. The sublimation ink receiving layer coating and/or the topcoat layer coating may e.g. be dried at temperatures of up to 60° C. for 40 to 100 sec.

At least one sublimation ink comprising a sublimation dye may be applied to the sublimation ink receiving coating obtained as described above. Suitable sublimation inks include those described above. In principle, the sublimation ink may be applied to the sublimation ink receiving layer and to the topcoat layer using any suitable printing method. The sublimation ink preferably may be applied by inkjet printing.

If present, a functional active ingredient may be incorporated into the dried sublimation ink receiving coating, e.g., the sublimation ink receiving layer and/or the topcoat layer by applying a solution or dispersion thereof or the neat functional active ingredient in liquid or gaseous form to the dried coating layer. Suitable solvents for forming the solution or dispersion of the functional active ingredient include those discussed in EP 3 590 721 A1. In principle, the solution or dispersion of the functional active ingredient or the neat in liquid form may be applied using any of the methods mentioned above for applying the sublimation ink receiving layer coating composition and/or the topcoat layer coating composition. Application by spraying may be preferred. In this particular context spraying also includes ink jet printing of a solution or dispersion comprising the functional active ingredient or the neat in liquid form to the sublimation ink receiving coating.

It may be preferred to apply the sublimation dye and the functional active ingredient to the sublimation ink receiving coating in separate steps, e.g., the sublimation ink may be applied before, while or after, preferably before or after the functional active ingredient is incorporated.

Moreover, the present invention relates to a method for providing at least a part of a surface of an article with a sublimation dye and/or another functional active ingredient. The method comprises the steps of applying at least one sublimation ink comprising a sublimation dye and/or at least another functional active ingredient to the sublimation ink receiving coating of the inkjet printable transfer medium of the present invention, positioning the transfer medium relative to the article such that the topcoat layer is facing the surface of the article to be provided with a sublimation dye and/or another functional active ingredient; and applying heat to the transfer medium to transfer the sublimation dye(s) and/or the functional active ingredient(s) from the sublimation ink receiving coating to at least a part of the surface of the article.

The sublimation ink comprising the sublimation dye and/or the functional active ingredient may be applied to the sublimation ink receiving coating by usual methods known in the art as described above. Preferably, the sublimation ink is applied by inkjet printing.

In terms of the present invention the term "facing" means that the inkjet printable transfer medium is positioned relative to the article in such a way that the inkjet printable transfer medium, specifically the topcoat layer is in direct contact with the surface of the article to be provided with the sublimation dye and/or another functional active ingredient, i.e., at a distance of 0 mm, so that the sublimation dye and/or another functional active ingredient can be transferred by heat.

When the sublimation ink receiving coating is brought in close proximity to or in direct contact with the surface of an article, the least one sublimation dye and/or another functional active ingredient may be transferred from the sublimation ink receiving coating to the surface of the article by means of heat and optionally pressure. As used herein the term pressure includes both increased and reduced pressure, i.e., a pressure above or below $1{,}03125 \times 10^5$ N/m² (1.0 bar), respectively. The differential pressure for transferring the sublimation ink and/or another functional active ingredient according to the present invention can be set in the range of from $1 \cdot 10^4$ to $1 \cdot 10^5$ Pa (0.1 to 1.0 bar) reduced pressure, or above, e.g., 1·105 to 6·105 Pa (1.0 to 6.0 bar) excess pressure on one side of the printed transfer medium or in combination of reduced and increased pressure on both sides of the printed transfer medium. Suitable transferring methods are described, e.g., in GB 2547183 A.

In the method for providing at least a part of a surface of an article with a sublimation dye and/or another functional active ingredient, the temperature applied for transferring the sublimation dye and/or functional active ingredient, may be independently selected to be in the range of from about 100° C. to about 220° C., preferably from about 110° C. to about 200° C., more preferably from 130° C. to 180° C., even more preferably from about 140° C. to about 170° C. Typically, the heat for transferring the sublimation dye and/or functional active ingredient is applied for 1 min to 10 min, preferably for 1 min to 6 min. Further, if more than one functional active ingredient and/or more than one sublimation dye are present, the temperature applied for transferring may be independently selected for each of them.

As explained above, transfer of a substance, whether it is a sublimation dye or another functional active ingredient, takes place, once a temperature specific for each substance at the applied pressure is reached, herein referred to as transfer temperature. Without wishing to be bound by theory, it is believed that at least a portion of the sublimation dye and/or the functional active ingredient transitions to the gaseous state and is transferred to the surface of the article in said gaseous state where it re-solidifies upon cooling. However, it cannot be excluded that at least some part of the material is transferred in a liquid state, i.e., a transfer via e.g. set-off also may take place in the method of the present invention.

Optionally, the method for providing at least a part of a surface of an article with a sublimation dye and/or another functional active ingredient may comprise the step of thermoforming the transfer medium to conform with the surface of the article to be provided with the sublimation dye and/or another functional active ingredient, after the step of positioning the transfer medium relative to the article such that the topcoat layer is facing the surface of the article to be provided with a sublimation dye and/or another functional active ingredient and before the step of applying heat to the transfer medium to transfer the sublimation dye(s) and/or the functional active ingredient(s) from the sublimation ink receiving coating to at least a part of the surface of the article.

According to the present invention, the temperature applied for thermoforming the transfer medium of the present invention may be independently selected to be in the range of from about 100° C. to about 220° C., preferably from about 110 to about 200° C., more preferably from about 130° C. to about 180° C., even more preferably from about 140° C. to about 170° C. Typically, the heat for thermoforming the transfer medium of the present invention is applied for 1 min to 10 min, preferably for 1 min to 6 min.

In addition, differential pressure may be applied across the transfer medium combined with the article to be provided with the sublimation dye and/or the functional active ingredient during the thermoforming and transfer step(s), typically being set in the range of from 1104 to 1105 Pa (0.1 to 1.0 bar) reduced pressure, or above, e.g., 1·105 to 6·105 Pa (1.0 to 6.0 bar) excess pressure on one side of the printed transfer medium or in combination of reduced and increased pressure on both sides of the printed transfer medium. Devices for simultaneously applying heat and optionally pressure to the transfer material combined with the article to be provided with the sublimation dye and/or the functional active ingredient are commercially available and include e.g., heat presses and calenders for essentially flat articles and so-called dye-sub ovens for non-flat articles. Dye-sub ovens usually use either forced hot air or IR technology and employ reduced pressure. Heat and optionally pressure typically are applied for about 1 to about 10 min, preferably for about 1 to about 6 min.

Thermoforming of the transfer medium may take place while the sublimation dye and/or functional active ingredient is transferred to the surface of said article.

According to the present invention, the sublimation dye and another functional active ingredient may be transferred to a part of the surface of an article. Said part of the surface provided with the functional active ingredient may be the same as, partially overlapping with or different from the part of said surface provided with the sublimation dye. The sublimation dye may be transferred together with the at least one functional active ingredient in the step of applying heat to the transfer medium of the method for providing at least a part of a surface of an article with sublimation dye and/or another functional active ingredient. The sublimation dye may also be transferred before or after the at least one functional active ingredient is/has been transferred.

According to the present invention, the surface of the article to be provided with the sublimation dye and/or functional active ingredient may comprise a polymeric material. Suitable polymeric materials include the thermoplastic polymers described above. Preferably the surface of the article to be provided with the sublimation dye and/or functional active ingredient comprises a polyester and/or a polyamide. It will be appreciated by a person skilled in the art that the surface of the article to be provided with the sublimation dye and/or another functional active ingredient comprises such a polymeric material, but it is not necessary that the whole article is made of said material. Rather the majority of the article may consist of one or more different materials, including e.g. wood, glass, steel, aluminum and other metals or combinations thereof, as long as the surface of the article to be provided with the sublimation dye and/or functional active ingredient comprises a polymeric material.

Further, the article preferably may be selected from the group consisting of textiles and leatherware, including clothing and footwear; bottles; ceramics; luggage items; pieces of furniture and home decor articles; glassware and crockery; household appliances; tools; sanitary items; medical equipment and tools; prosthetics; electrical appliances, including computers and mobile phones; vehicles, including automobiles, motorcycles, bicycles, ships and aircrafts; buildings; toys; jewelries and watches; protective helmets; accessories for and parts of the aforementioned articles; as well as packaging, wrappings and covers, including protective covers. Some examples include e.g. mobile phone back covers, game consoles, keys for a computer keyboard, mugs, casings of a coffee machine, toilet lids, sun shades, bags, suitcases, food wrappings, dashboards, ID cards, table covers, just to name a few.

If the article comprises a thermoplastic material, said thermoplastic material may be formed into a desired shape while the article and the transfer medium are heated in the thermoforming step or the transferring step of the method for providing at least a part of a surface of an article with sublimation dye and/or another functional active ingredient as described above. The thermoplastic material comprises at least one thermoplastic polymer. Suitable and preferred thermoplastic polymers include those described above with respect to the carrier substrate.

Further, the present invention also relates to the use of the inkjet printable transfer medium and the method for providing at least a part of a surface of an article with a sublimation dye and/or another functional active ingredient according to the present invention in the field of packaging, including packaging of food; electronics, including consumer electronics; machinery, device and equipment manufacturing; toolmaking; architecture and construction; decoration, including interior decoration; or advertising; or in the domestic or sanitary appliance, automotive, aerospace or textile and clothing industry.

LIST OF REFERENCE SIGNS

1 Carrier substrate
2 Sublimation ink receiving coating
3 Sublimation ink receiving layer
4 Topcoat layer
5 Polymeric particles
10 Transfer Medium

EXAMPLES

Figure 1:
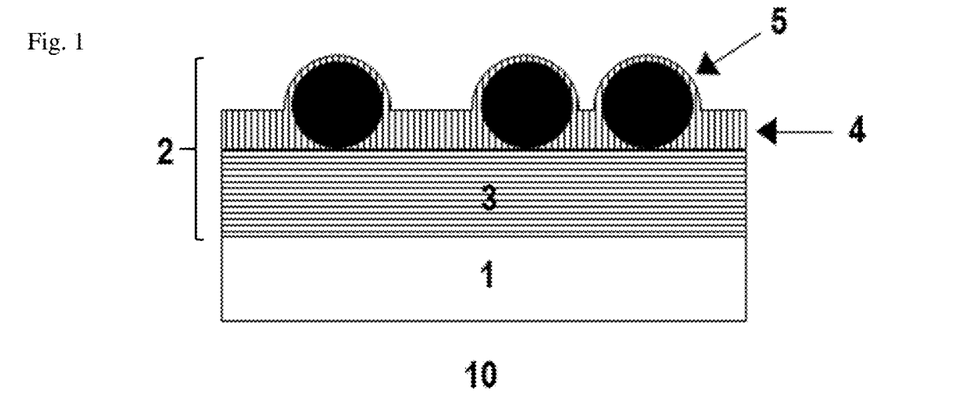
FIG. 1 (not to scale) shows a schematic cross-section of an exemplary embodiment of an inkjet printable transfer medium 10 according to the present invention. The transfer medium comprises a sublimation ink receiving coating 2 over a carrier substrate 1. The sublimation ink receiving coating comprises a sublimation ink receiving layer 3 and a topcoat layer 4 comprising a monolayer of protruding polymeric particles 5.
Figure 2:
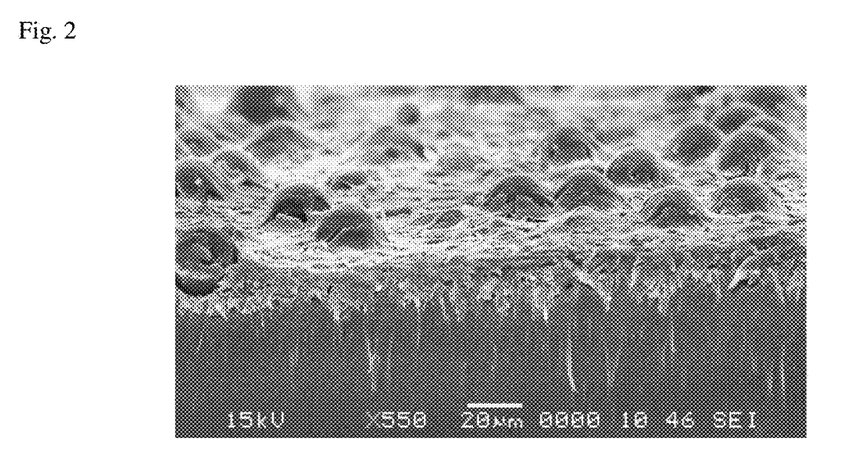
FIG. 2 shows a scanning electron microscopy (SEM) image of a side view of a transfer medium according to the present invention.

Determining Particle Size Distribution by Confocal Laser Scanning Microscopy

The confocal laser scanning microscopy was performed on a Color 3D Laser Microscope VK-9710 available from Keyence Corporation (Osaka) to determine the particle size. The CF IC EPI Plan Apo 50× objective lens available from Nikon is used. A sample of polymeric particles was applied onto a substrate having an adhesive surface (e.g., an adhesive tape) in order to fix the polymer particles and forming a monolayer of the polymer particles on the adhesive surface. The sample was evaluated using a wavelength of 408 nm (violet laser). The sample was investigated in focus planes in steps of 0.02 μm starting from below the bottom of the polymeric particles up to a plane above the polymeric particles. The settings shown in Table 3 were applied.

TABLE 3

Confocal laser scanning microscopy settings

| | |
|---|---|
| Optical zoom | 1x |
| Modus | Surface Profile |
| Quality | super fine |
| Z-step increment | 0.02 μm |
| Brightness 1 | 834 |
| ND-Filter | intensity 100% |
| Filter | none |

30 single particles were measured using the software VK-Analyse Modul Plus/Version 3.3.0.0 from Keyence Corporation (Osaka). The average particle size as well as the standard deviation of the particle size was determined.

Alternatively, the particle of a finished coated film can be evaluated by redispersing the topcoat layer and separating the polymer particles for microscopic analysis.

Determining the Number of Polymeric Particles on Transfer Medium

To analyse the number of polymeric particles on a transfer medium, the same device and the same settings were applied as described above for determination of the particle size distribution. A tilt correction function was performed. An area of 200×258 μm$^2$ was observed in top view (90° angle) onto the surface of the transfer medium on which the sublimation ink receiving coating is applied. The polymeric particles of the topcoat layer were clearly visible on the surface of the transfer medium. The polymer particles were counted, whereby the polymer particles that lie on the edge of the image and were therefore only visible partially were counted in half. Fifteen different areas of a single transfer medium were measured according to this method. The counted number of the polymeric particles was divided by the total area of 15×200×258 μm$^2$ and related to an area of 1 mm$^2$.

Protrusion Measurement of Polymeric Particles in Topcoat Layer

To analyse the protrusion of polymeric particles in the topcoat layer of a transfer medium, the same device and the same settings were applied as described above for determination of the particle size distribution. The menu item "Profit" of the analysis software VK-Analyse Modul Plus/Version 3.3.0.0 from Keyence Corporation (Osaka) was used. A virtual cut line was drawn through a single particle, wherein the cut line corresponded to the height of the binder plane on both sides of the single particle.

The distance between the maximum of the protrusion caused by the polymer particle and the binder plane of the topcoat was measured. The distance was measured for fifteen different protrusions/polymer particles of the same transfer medium sample and the average protrusion was determined in p.m. This distance was related to the average particle size of the used polymeric particles to determine the percentage of protrusion from the surface of the topcoat layer.

Preparation of Inkjet Printable Transfer Medium

Example 1

An inkjet printable transfer medium was prepared as follows. The components of the sublimation ink receiving layer formulation 1 as shown in Table 4 were are mixed to provide a dispersion.

TABLE 4

Sublimation ink receiving layer formulation 1

| Component | | Parts per weight | Supplier |
|---|---|---|---|
| Water | | 32.40 | — |
| Akucell AF0305 | Carboxymethylcellulose | 2.60 | Nouryon |
| Orgasol 3501 EXD NAT1 | Polyamide particles (20 μm) | 2.00 | Arkema |

TABLE 4-continued

Sublimation ink receiving layer formulation 1

| Component | | Parts per weight | Supplier |
|---|---|---|---|
| Gasil HP395 | Synthetic amorphous silicium dioxide | 0.40 | PQ Corporation |
| Cationic polyvinyl acetate dispersion in water (40 wt.-% solids) | | 2.00 | — |
| Tanacoat EP 6018 | Polyurethane dispersion in water (37 wt.-% solids) | 2.00 | Tanatex Chemicals |
| Polyvinyl alcohol grafted with N-vinylcaprolactam in water (20 wt.-% solids) | | 54.50 | — |
| Glycerol | | 0.40 | — |
| Defoaming agent | | 0.20 | — |
| Wetting agent | | 0.20 | — |
| Ethanol | | 3.30 | — |

The dispersion was applied to an APET polymer film (type PET-A 140, A3 size, having 200 μm thickness) supplied by Folienwerk Wolfen GmbH (Germany) as a carrier substrate using a Mayer rod forming the sublimation ink receiving layer and then dried at 60° C. for 3 min in an oven receiving a sublimation ink receiving layer having a dry coating weight of 10 g/m². A topcoat layer was prepared by mixing the components of the topcoat layer formulation 1 shown in Table 5 to provide a dispersion.

TABLE 5

Topcoat layer formulation 1

| Component | | Parts per weight | Supplier |
|---|---|---|---|
| Water | | 89.35 | — |
| Denka Poval B 33 | Polyvinyl alcohol | 4.00 | Denka Company Ltd. (Japan) |
| Akucell AF0305 | Carboxymethylcellulose | 2.30 | Nouryon |
| Dynoadd P 530 | Polymethylmethacrylate particles | 4.00 | Dynea |
| Defoaming agent | | 0.20 | — |
| Wetting agent | | 0.15 | — |

The topcoat layer dispersion was applied onto the sublimation ink receiving layer by using a Mayer rod and dried in an oven at 60° C. for 3 min to provide a topcoat layer having a dry coating weight of 2 g/m².

Example 2

The transfer medium was prepared in the same way as described in Example 1 except that the dry coating weight of the sublimation ink receiving layer was increased to 15 g/m² and the dry coating weight of the topcoat layer was increased to 3 g/m².

Example 3

The transfer medium is prepared in the same way as described in Example 1 except that the sublimation ink receiving layer formulation 2 is used (Table 6).

TABLE 6

Sublimation ink receiving layer formulation 2

| Component | | Parts per weight | Supplier |
|---|---|---|---|
| Water | | 87.70 | — |
| Surfynol 440 | Wetting agent | 0.03 | Evonik |
| Triethanolamine | | 0.17 | — |
| Poval 26/88 | Polyvinyl alcohol | 7.40 | Kuraray |
| Poval 4/88 | Polyvinyl alcohol | 2.40 | Kuraray |
| Luvitec K-90 | Polyvinylpyrrolidone | 1.60 | BASF |
| Triethylene glycol | | 0.70 | — |

Example 4

The transfer medium was prepared in the same way as described in Example 1 except that the topcoat formulation 2 is used (Table 7).

TABLE 7

Topcoat layer formulation 2

| Component | | Parts per weight | Supplier |
|---|---|---|---|
| Water | | 94.45 | — |
| Poval 20/98 | Polyvinyl alcohol | 5.00 | Kuraray |
| Syloid 72 | Silica | 0.20 | Grace |
| Defoaming agent | | 0.20 | — |
| Wetting agent | | 0.15 | — |

Printing Onto the Inkjet Printable Transfer Medium

On the topcoat layer of the thus prepared transfer media of Examples 1 to 4, sublimation dyes were printed as color bars in the colors cyan, magenta, yellow, black, red, green and blue with an Epson SureColor T3200 ink jet printer available from Seiko Epson Corporation. An ink limit of 270% was set by profiling with Colorgate software.

After printing, the applied sublimation dyes were dried at 25° C. for 30 sec at ambient conditions. A smear test was performed by smearing by finger with slight pressure over the printed color bars.

The optical density of the cyan, magenta, yellow and black sublimation dyes were measured according to ISO-13655:2017-07 using an X-Rite eXact (Advanced, Standard Basic Plus, Mode D50/2°, M0) available from X-Rite.

A high gloss surface of a white three-dimensional mobile phone cover made of polyester was provided with the sublimation dyes by thermoforming the transfer medium and transferring the sublimation dyes using Elvajet-Opal SB inks from Sun Chemical Corporation (Switzerland). The program shown in Table 8 was used for the thermoforming and sublimation dye transfer in a thermoforming device type SSA3-2 from Technical Image Applications Ltd. (UK).

TABLE 8

Temperature program

| | |
|---|---|
| Soften time 1 | 7 sec |
| Soften time 2 | 6 sec |
| Soften time 3 | 5 sec |
| SOV Open temperature | 100° C. |
| Vacuum time | 25 sec |
| Sublimation time | 150 sec |

TABLE 8-continued

| Temperature program | |
|---|---|
| Sublimation temperature | 150° C. |
| Cooling temperature | 90° C. |

The thermoforming and sublimation dye transfer process was finished after 3 min. After cooling down, the transfer medium was separated by hand from the printed three-dimensional high gloss mobile phone cover.

Subsequently the optical density of the transferred sublimation dye on the high gloss surface of the three-dimensional mobile phone cover (made of polyester) were determined according to ISO-13655:2017-07 as described above. The evaluated properties of the transfer media of Examples 1 to 4 are summarized in Table 9. The particle size distribution, number of polymeric particles on the transfer medium and the protrusion of polymeric particles of Example 4 could not be evaluated as the used silica particles have a broad particle size distribution.

TABLE 9

Properties of transfer media of Examples 1 to 4

| | Ex. 1 | Ex. 2 | Ex. 3 | Ex. 4 |
|---|---|---|---|---|
| Carrier substrate APET [μm] | 200 | 200 | 200 | 200 |
| Sublimation ink receiving layer formulation | 1 | 1 | 2 | 1 |
| Dry coating weight of sublimation ink receiving layer [g/m²] | 10 | 15 | 10 | 10 |
| Topcoat layer formulation | 1 | 1 | 1 | 2 |
| Dry coating weight of topcoat layer [g/m²] | 2 | 3 | 2 | 2 |
| Particle size [μm] | 30 | 30 | 30 | — |
| Particles per mm² | 170 | 190 | 180 | — |
| Particle protrusion [μm] | 18 | 25 | 20 | — |
| Particle protrusion [%] | 60 | 83 | 67 | — |
| Drying | instant | instant | instant | instant |
| Smear test | ok | ok | ok | ok |
| Optical density Cyan | 1.99 | 2.37 | 1.80 | 1.49 |
| Optical density Magenta | 1.95 | 2.02 | 1.85 | 1.84 |
| Optical density Yellow | 1.58 | 1.88 | 1.67 | 1.26 |
| Optical density Black | 1.85 | 2.06 | 1.72 | 1.68 |
| Print artefacts | none | none | none | Inhomogeneous color bars |

The optical density of the colors transferred by the transfer media of Examples 1 to 3 are superior to the optical density of the colors transferred by the transfer medium of comparative Example 4. In addition, the transferred color bars of Example 4 show an inhomogeneous structure, particularly the red, green and blue color bars.

The invention claimed is:

1. An inkjet printable transfer medium for transferring a sublimation dye and/or another functional active ingredient to a surface of an article by means of heat in a thermoforming process, wherein the transfer medium comprises:
    a carrier substrate comprising a thermoplastic polymer; and
    a sublimation ink receiving coating comprising
        (a) at least one sublimation ink receiving layer formed over at least a part of one surface of the carrier substrate, the sublimation ink receiving layer comprising at least one of (i) a polyvinyl alcohol and (ii) an N-functional group-containing polymer, or (iii) a polyvinyl alcohol containing N-functional groups; and
        (b) a topcoat layer formed over at least a part of the sublimation ink receiving layer, the topcoat layer comprising (i) polymeric particles and at least one (ii) binder comprising a material selected from the group consisting of polyvinyl alcohol, modified cellulose, and combinations thereof.

2. The inkjet printable transfer medium according to claim 1, wherein the thermoplastic polymer is selected from the group consisting of poly(methyl methacrylates) (PMMA), thermoplastic polyurethanes (TPU), polyethersulfones (PES), polyethylene terephthalates (PET), amorphous polyethylene terephthalates (APET), polyethylene terephthalates modified by ethylene glycol (PETG), polybutylene terephthalates (PB), cast polypropylenes (cPP), polycarbonates (PC), polyvinylchlorides (PVC), copolymeric polyoxymethylenes (POM-C), acrylonitrile butadiene styrenes (ABS), polystyrenes (PS), polyamides (PA), polylactic acids (PLA), cellulose acetates, copolymers thereof, and mixtures thereof.

3. The inkjet printable transfer medium according to claim 1, wherein the carrier substrate has a thickness in the range of from 75 μm to 500 μm; and/or wherein the sublimation ink receiving layer (a) has a dry coating weight in the range of from 5 g/m² to 40 g/m².

4. The inkjet printable transfer medium according to claim 1, wherein the N-functional group-containing polymer (a-ii) or the polyvinyl alcohol containing N-functional groups (a-iii) comprises amino groups, amido groups or a combination thereof, and/or wherein the N-functional group-containing polymer (a-ii) is made from a monomer mixture comprising at least a monomer selected from the group consisting of N-vinyl caprolactam, N-vinyl piperidine, N-vinyl pyrrolidone, N-vinyl formamide, alkyl-2-oxazoline, acrylamide, N-vinylacetamide, N,N-dimethylacrylamide, N,N-diethylacrylamide, N-isopropylacrylamide, N,N-dimethylaminopropyl acrylamide, diacetone acrylamide, N-hydroxyethyl acrylamide, N-vinyl-imidazole, N-vinyl pyridine, amino-functional (meth)acrylates or combinations thereof, or the polyvinyl alcohol containing N-functional groups (a-iii) is made from a monomer mixture comprising at least a monomer selected from the group consisting of N-vinyl caprolactam, N-vinyl piperidine, N-vinyl pyrrolidone, N-vinyl formamide, acrylamide, N-vinylacetamide, N,N-dimethylacrylamide, N,N-diethylacrylamide, N-isopropylacrylamide, N,N-dimethylaminopropyl acrylamide, diacetone acrylamide, N-hydroxyethyl acrylamide, N-vinyl-imidazole, N-vinyl pyridine, amino-functional (meth)acrylates, or combinations thereof.

5. The inkjet printable transfer medium according to claim 1, wherein the N-functional group-containing polymer (a-ii) comprises a graft polymer comprising N-functional group-containing side chains.

6. The inkjet printable transfer medium according to claim 1, wherein the mass ratio of the polyvinyl alcohol (a-i) to the N-functional group-containing polymer (a-ii) is from 1:4 to 20:1; or wherein the mass ratio of the polyvinyl alcohol to the N-functional group-containing compound of the polyvinyl alcohol containing N-functional groups (a-iii) is from 1:4 to 20:1.

7. The inkjet printable transfer medium according to claim 1, wherein the polymeric particles (b-i) comprise polyamide, (co)poly(meth)acrylate, (co)polystyrene, polysiloxane, polyurethane, copolymers thereof, or combinations thereof.

8. The inkjet printable transfer medium according to claim 1, wherein the polymeric particles (b-i) have a monomodal particle size distribution; and/or have a mean particle size in the range of from 10 μm to 100 μm imdetermined by confocal laser scanning microscopy.

9. The transfer medium according to claim 1, wherein the topcoat layer (b) comprises 10 to 60 wt.-% of the polymeric particles (i) and/or 40 to 90 wt.-% of the binder (ii), based on the dry weight of said layer.

10. The inkjet printable transfer medium according to claim 1, wherein the modified cellulose is selected from the group consisting of cellulose esters, cellulose ethers, and combinations thereof; and/or
    wherein the topcoat layer does not include cellulose fibers.

11. The inkjet printable transfer medium according to claim 1, wherein the polymeric particles (b-i) are present as a monolayer in the topcoat layer; or wherein the number of polymeric particles (b-i) in the monolayer of polymeric particles (b-i) having a mean particle size of up to 50 μm is in the range of from 50 polymeric particles per 1 mm$^2$ of the transfer medium to 300 polymeric particles per 1 mm$^2$ of the transfer medium; and/or
    wherein the at least one binder (b-ii) at least partially embeds the polymer particles (b-i) in such a way that the polymeric particles (b-i) protrude at least one third of their diameter on the surface of the topcoat layer.

12. A method for providing at least a part of a surface of an article with a sublimation dye and/or another functional active ingredient comprising:
    (a) applying at least one sublimation ink comprising a sublimation dye and/or at least another functional active ingredient to the sublimation ink receiving coating of the inkjet printable transfer medium according to claim 1;
    (b) positioning the transfer medium relative to the article such that the topcoat layer is facing the surface of the article to be provided with a sublimation dye and/or another functional active ingredient;
    (c) optionally thermoforming the transfer medium to conform with the surface of the article to be provided with the sublimation dye and/or another functional active ingredient;
    (d) applying heat to the transfer medium to transfer the sublimation dye(s) and/or the functional active ingredient(s) from the sublimation ink receiving coating to at least a part of the surface of the article.

13. The method according to claim 12, wherein the temperature applied in step(s) (c) and/or (d) is independently selected to be in the range of from 100° C. to 220° C.

14. The method according to claim 12, wherein the article is in the field of packaging, including packaging of food; electronics, including consumer electronics; machinery, device and equipment manufacturing; toolmaking; architecture and construction; decoration, including interior decoration; or advertising; or in the domestic or sanitary appliance, automotive, aerospace or textile and clothing industry.

15. A method for preparing an inkjet printable transfer medium according to claim 1, which comprises forming the sublimation ink receiving coating over at least a part of one surface of the carrier substrate by:
    (a) applying a composition comprising at least (i) a polyvinyl alcohol and (ii) an N-functional group-containing polymer or comprising (iii) a polyvinyl alcohol containing N-functional groups over at least a part of one surface of a carrier substrate to form a sublimation ink receiving layer;
    (b) optionally drying the coating formed in step (a);
    (c) applying a composition comprising (i) polymeric particles and at least one (ii) binder comprising a material selected from the group consisting of polyvinyl alcohol, modified cellulose, and combinations thereof over at least a part of the sublimation ink receiving layer to form a topcoat layer; and
    (d) drying the coating formed in step (c) or steps (a) and (c).

\* \* \* \* \*

UNITED STATES PATENT AND TRADEMARK OFFICE
CERTIFICATE OF CORRECTION

PATENT NO. : 11,667,802 B2
APPLICATION NO. : 17/667131
DATED : June 6, 2023
INVENTOR(S) : Axel Niemöller et al.

Page 1 of 1

It is certified that error appears in the above-identified patent and that said Letters Patent is hereby corrected as shown below:

In the Claims

Column 26, Line 66, Claim 8, delete "imdetermined" and insert -- determined --

Column 27, Line 1, Claim 9, before "transfer" insert -- inkjet printable --

Signed and Sealed this
Thirteenth Day of February, 2024

Katherine Kelly Vidal
*Director of the United States Patent and Trademark Office*